United States Patent [19]

Rohr

[11] 4,113,324
[45] Sep. 12, 1978

[54] AUXILIARY BEARING FOR DETERMINING RADIAL AND AXIAL PLAY OF TURBINE SHAFTS

[75] Inventor: Karl Rohr, Mülheim, Ruhr, Germany

[73] Assignee: Kraftwerk Union Aktiengesellschaft, Mülheim, Ruhr, Germany

[21] Appl. No.: 742,195

[22] Filed: Nov. 16, 1976

[30] Foreign Application Priority Data

Nov. 18, 1975 [DE] Fed. Rep. of Germany ....... 2551801

[51] Int. Cl.² .............................................. F16C 23/00
[52] U.S. Cl. ........................................ 308/9; 308/32; 308/122; 308/DIG. 8
[58] Field of Search .................... 308/9, 15, 27, 31, 32, 308/3 R, 33, 5, DIG. 8, 106, 121, 123, 122, 28

[56] References Cited

U.S. PATENT DOCUMENTS

| 1,221,233 | 4/1917 | Sherwood | 308/31 |
| 3,679,272 | 7/1972 | Costa et al. | 308/9 |
| 3,751,119 | 8/1973 | Bellati et al. | 308/9 |
| 3,804,475 | 4/1974 | Brücher et al. | 308/122 |
| 3,985,408 | 10/1976 | Bierlein et al. | 308/DIG. 8 X |

FOREIGN PATENT DOCUMENTS 1,525,234  2/1972  Fed. Rep. of Germany .............. 308/9

*Primary Examiner*—Trygve M. Blix
*Assistant Examiner*—Douglas C. Butler
*Attorney, Agent, or Firm*—Herbert L. Lerner

[57] ABSTRACT

Auxiliary bearing for determining radial and axial play of a turbine shaft, the auxiliary bearing having a bridge-shaped carrying yoke mounted on bearing brackets axially adjacent operating bearing shells, swingable and turnable adjusting bolts suspending a semicircular support yoke from the bridge-shaped carrying yoke, and adjusting bolts horizontally screwable into the semicircular support yoke so as to deflect the latter laterally, includes a lining of antifriction metal disposed on the inner periphery of the semicircular support yoke for slideably supporting the turbine shaft, the lining of antifriction metal being formed with three oil pockets serially disposed in peripheral direction thereof, and including a separate pressure oil feed line connection to each of the three oil pockets.

3 Claims, 4 Drawing Figures

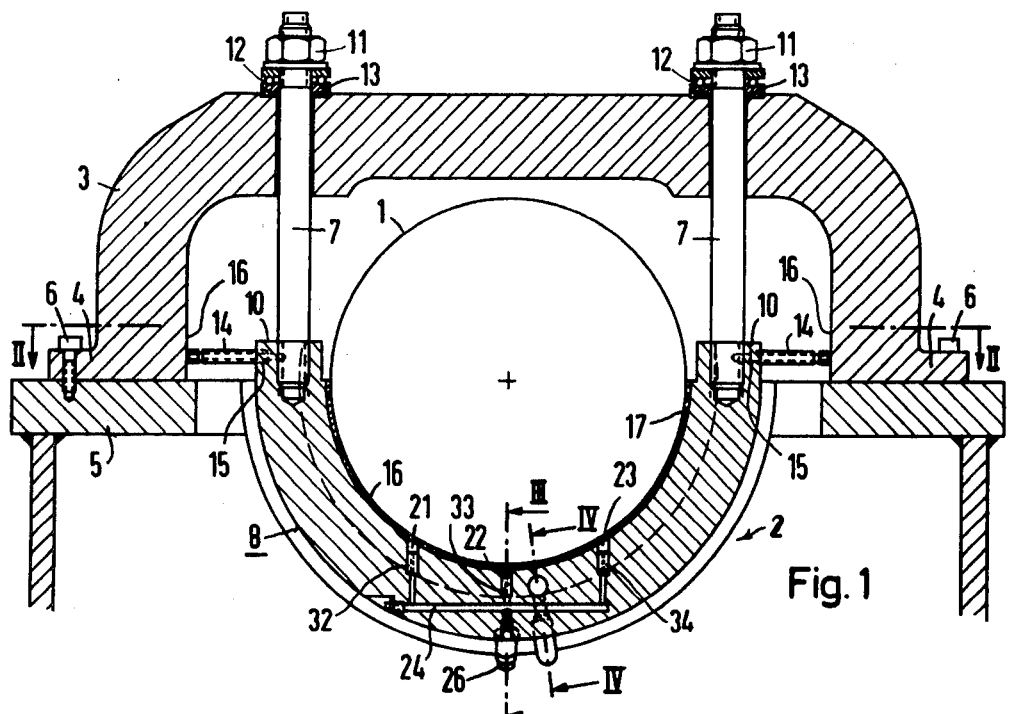
Fig. 1
Fig. 2
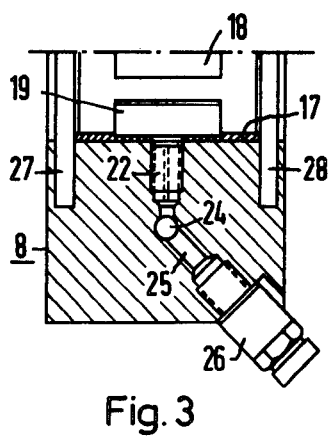
Fig. 3
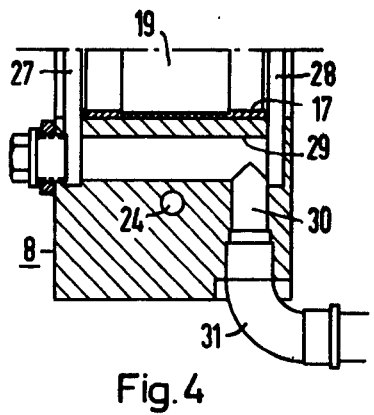
Fig. 4

AUXILIARY BEARING FOR DETERMINING RADIAL AND AXIAL PLAY OF TURBINE SHAFTS

The invention relates to an auxiliary bearing for determining radial and axial play of turbine shafts and, more specifically, such an auxiliary bearing having a bridge-shaped carrying yoke disposed on bearing brackets axially near an operating bearing block or shell, and a semicircular support yoke suspended by swingable and rotatable or turnable adjusting bolts and supporting the shaft, the support yoke being additionally deflectable laterally by adjusting bolts horizontally screwable into the support yoke.

An auxiliary bearing of the foregoing general type has been known heretofore from German Published Non-Prosecuted application DT-OS 1,525,234. In order for the play existing between the shaft or the bladed rotor, respectively, and the turbine housing to be determinable with such an auxiliary bearing by raising and lowering as well as laterally displacing or shifting the shaft, it is necessary that the shaft be easily rotatable while the measurements are being taken. The heretofore commonly employed roller or needle bearings on the inside of the support yoke, however, are no longer fully efficient functionally or operably when the weight of the shaft is relatively heavy because, due to the high pressures per unit area, damage to the shaft or jamming as well as fracture of the individual rollers or needles of the antifriction or roller bearings will have occurred.

It is accordingly an object of the invention to provide an auxiliary bearing for determining radial and axial play of a turbine shaft of such construction that the shaft can be easily rotated by hand even if the weight of the shaft is relatively heavy.

With the foregoing and other objects in view, there is provided, in accordance with the invention, an auxiliary bearing for determining radial and axial play of a turbine shaft, the auxiliary bearing having a bridge-shaped carrying yoke mounted on bearing brackets axially adjacent operating bearing shells, swingable and turnable adjusting bolts suspending a semicircular support yoke from the bridge-shaped carrying yoke, and adjusting bolts horizontally screwable into the semicircular support yoke so as to deflect the latter laterally, the improvement therein comprising a lining of antifriction metal, such as babbitt metal, disposed on the inner periphery of the semicircular support yoke for slideably supporting the turbine shaft, the lining of antifriction metal being formed with three oil pockets serially disposed in peripheral direction thereof, and including a separate pressure oil feed line connection to each of the three oil pockets.

By supporting the shaft on a pressure oil cushion in this manner, it is possible to lift the shaft slightly by applying appropriate oil pressure and consequently rotate the shaft easily on the oil film.

In accordance with another feature of the invention, the lining of anti-friction metal and the support yoke are formed with a respective oil collecting slot extending, respectively, on both sides of the three serially disposed oil pockets along the entire periphery of the support yoke and the lining so that the oil escaping laterally between the shaft and the support yoke can be collected and led away.

In accordance with a further feature of the invention, an axially extending connecting bore is formed in the support yoke and is connected to the oil collecting slots at lowermost locations thereof.

In accordance with an added feature of the invention, the separate pressure oil feed line connections comprise oil feed bores formed in the support yoke and communicating respectively with the oil pockets at lowermost locations thereof, the oil feed bores being connected in common to a connecting bore also formed in the support yoke and extending transversely to the axis of the auxiliary bearing, and an outwardly extending pressure oil feed line connected, in turn, to the connecting bore.

In accordance with a concomitant feature of the invention, the auxiliary bearing includes a choke respectively disposed in each of the oil feed bores and having a flow-through cross section adjusted to a given oil pressure for the respective oil feed bore.

Other features which are considered as characteristic for the invention are set forth in the appended claims.

Although the invention is illustrated and described herein as embodied in an auxiliary bearing for determining radial and axial play of turbine shafts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a longitudinal sectional view of an auxiliary bearing for determining radial and axial play of turbine shafts constructed in accordance with the invention;

FIG. 2 is a cross-sectional view of FIG. 1 taken along the line II—II in the direction of the arrows and providing a top plan view of the support yoke showing oil pockets formed therein;

FIG. 3 is a cross-sectional view of FIG. 1 taken along the line III—III in the direction of the arrows and showing the support yoke in vicinity of a pressure oil inlet; and FIG. 4 is a cross-sectional view of FIG. 1 taken along the line IV—IV in the direction of the arrows and showing the support yoke in vicinity of an oil discharge line.

Referring now to the drawing and first, particularly, to FIG. 1 thereof, there is shown an auxiliary bearing 2 according to the invention carrying a shaft 1 and having a bridge-like carrying yoke 3 disposed by means of lugs 4 thereof on a bearing pedestal or bracket 5 and fastened thereon by screws 6. A semi-circular support yoke 8 is suspended by adjusting bolts 7 from the bridge-like carrying yoke 3 and surrounds the shaft 1. The support yoke 8 is lined with a white-metal or babbitt metal layer 17 to be described more fully hereinafter. The adjusting bolts 7 are screwed at the lower end thereof into the radial end faces 10 of the support yoke 8 and are turnably and swingably suspended at the upper end thereof by means of ball bearings which are disposed between a nut 11 screwed onto the adjusting bolts 7 and the carrying yoke 3, as well as support members 13 having a spherical calotte-shaped bearing or contact surface. By means of the adjusting bolts 7, it is possible to raise or lower the shaft 1.

In addition, horizontally disposed adjusting bolts 14 are provided between the bearing pedestals or brackets 5 and the support yoke and 8 can be screwed by one end thereof into a tapped hole 15 formed in the support yoke 8 in the vicinity of the end face 10 thereof and are braced at the other end thereof against planar lateral surfaces 36 of the carrying yoke 3. By turning or twisting the adjusted bolts 14, the support yoke 8 and the shaft 1 therewith can be shifted laterally. This lateral shift or displacement is rendered possible also by the spherical suspension 13 of the adjusting bolts 7.

In order then to permit measurement now of play up to the point that the shaft 1 brushes against or touches the surrounding housing parts, the shaft 1 must be rotated and therefore mounted so as to be readily slideable. For this reason, the inner periphery 16 of the support yoke 8 is initially lined, according to the invention, with a layer 17 of antifriction metal such as white metal or babbitt metal, which is then finished by turning in accordance with the shaft diameter. Into this layer of babbitt metal 17, three oil pockets 18, 19 and 20 are incised following one another serially in peripheral direction, as may be seen especially clearly in the top plan view of FIG. 2. Each of the oil pockets 18, 19 and 20 has, at the lowest point thereof, an oil feeding bore 21, 22 and 23 incised into the support yoke 8 and connected to one another by means of a horizontal connecting line 24 formed in the support yoke 8, as viewed in FIG. 1. As is evident particularly from the cross-sectional view of FIG. 3, another bore 25 extends from the connecting line 24 outwardly at an inclined angle and is connected to the pressure oil feed line 26 per se.

The pressure oil feed line 26 comes from a non-illustrated pressure oil pump which forces the bearing oil with appropriate initial pressure through the connecting lines into the individual oil pockets 18, 19 and 20, and thereby uniformly lifts the shaft slightly i.e. up to 0.04 mm, so that the shaft 1 can then be rotated easily, even manually In order to prevent too much oil from escaping laterally out of the oil pockets 18, 19 and 20 and flowing into the bearing space, oil collecting slots 27 and 28, extending over the entire inner periphery of the support yoke 8 and incised into the antifrictional babbitt metal layer 17 as well as into the material of the support yoke 8, are located on both sides of the oil pockets 18, 19 and 20. As can be seen particularly from FIG. 4, the two oil collecting slots 27 and 28 are connected to one another at approximately the lowest points thereof by means of an axial bore 29, from which an oil discharge line 31 extends to the outside through a further radial hole 30.

In the illustrated embodiment all three oil pockets 18, 19 and 20 are connected in common to the pressure oil feed line 26. However, in order also to apply different pressures between the shaft 1 and the support yoke 8, which are required particularly for relatively heavy weights of the shaft so that jamming of the lateral ends of the support yoke 8 can be avoided reliably, chokes 32, 33 and 34 which, respectively have a blow-through cross section that is adjusted or set to the required oil pressure in each oil pocket 18, 19 and 20, are inserted into the individual oil feeding bores 21, 22 and 23. It is also possible, however, to supply each oil pocket 18, 19 and 20 from a respective separate pressure oil pump.

The pressure oil cushion and the slight lifting of the shaft 1 resulting therefrom not only ensure easy rotation of the shaft 1 during measurement of radial play, but it is also possible to easily shift or displace the shaft 1 axially to measure axial play of the bladed rotor, which was impossible to accomplish with the heretofore conventional support by means of an anti-friction bearing.

There are claimed:

1. Auxiliary bearing for determining radial an axial play of a turbine shaft, the auxiliary bearing having a bridge-shaped carrying yoke mounted on bearing brackets, swingable and turnable adjusting bolts suspending a semicircular support yoke from the bridge-shaped carrying yoke, and adjusting bolts horizontally screwable into the semicircular support yoke so as to deflect the latter laterally, the improvement therein comprising a lining of antifriction babbitt metal disposed on the inner periphery of the semicircular support yoke for slideably supporting the turbine shaft, said lining of antifriction metal being formed with three oil pockets serially disposed in peripheral direction thereof, said lining of babbitt metal being formed with a respective oil collecting slot extending, respectively, on both sides of said three serially disposed oil pockets along the entire periphery of said support yoke, and including a separate pressure oil feed line connection to each of said three oil pockets, said separate pressure oil feed line connections comprise oil feed bores formed in said support yoke and communicating respectively with said oil pockets, and a choke respectively disposed in each of said oil feed bores, and having a flow-through cross secton adjusted to a given oil pressure for the respective oil feed bore.

2. Auxiliary bearing according to claim 1 wherein an axially extending connecting bore is formed in said support yoke and is connected to said oil collecting slots at lowermost locations thereof.

3. Auxiliary bearing according to claim 1 wherein communication by said oil feed bores with said oil pockets is at lowermost locations thereof, said oil feed bores being connected in common to a connecting bore also formed in said support yoke and extending transversely to the axis of the auxiliary bearing, and an outwardly extending pressure oil feed line connected, in turn, to said connecting bore.

* * * * *